United States Patent [19]

Elzy et al.

[11] Patent Number: 4,596,380
[45] Date of Patent: Jun. 24, 1986

[54] MOTOR VEHICLE MOUNTED APPARATUS FOR PULLING OPTICAL FIBER CABLE

[75] Inventors: Carl T. Elzy, Glendora; Robert A. Pomroy, Diamond Bar; Ronald B. Soyka, Woodland Hills, all of Calif.

[73] Assignee: General Telephone Company of California, Thousand Oaks, Calif.

[21] Appl. No.: 697,558

[22] Filed: Feb. 1, 1985

[51] Int. Cl.⁴ ............................................. F21C 29/16
[52] U.S. Cl. ............................................ 254/134.3 FT
[58] Field of Search ................ 242/86.5; 254/134.3 R, 254/134.3 FT, 134.3 PA, 323; 414/522

[56] References Cited

U.S. PATENT DOCUMENTS

| | | | |
|---|---|---|---|
| 2,704,191 | 3/1955 | Schley et al. | 254/323 |
| 3,829,064 | 8/1974 | Jackson | 254/134.3 R |
| 3,968,952 | 7/1976 | Newell | 254/134.3 R |
| 4,228,990 | 10/1980 | Horvath | 254/134.3 FT |
| 4,437,622 | 3/1984 | Heider | 242/86.5 R |
| 4,447,013 | 5/1984 | Sandered et al. | 254/134.3 R |
| 4,456,225 | 6/1984 | Lucas | 254/134.3 R |

FOREIGN PATENT DOCUMENTS

| | | | |
|---|---|---|---|
| 214012 | 7/1967 | Sweden | 254/323 |
| 303129 | 1/1955 | Switzerland | 254/323 |

OTHER PUBLICATIONS

Hydraulic Energy Co. Catalogue, HCPU-1 Light Guide Pulling System.

*Primary Examiner*—Robert C. Watson
*Attorney, Agent, or Firm*—Russell A. Cannon

[57] ABSTRACT

The apparatus is slide mounted on elongated bumper support members between the grill and front bumper of a pickup truck. The apparatus is powered by a hydraulic power take-off unit which is selectively connected through a selector valve assembly to a hydraulic tool circuit, and to a series connected tension control unit and speed control valve which feed hydraulic fluid to and return it from a motor that supports a capstan. The control unit bypasses fluid away from the pump when the hydraulic pressure exceeds a maximum allowable value which corresponds to a maximum allowable pull force on the cable. The control unit includes a valve that can be manually actuated for bypassing hydraulic fluid back to the power take-off unit when the speed control valve is closed and/or it is desired to manually terminate a cable pull. Only when it is desired to pull cable is the capstan extended beyond a fender and connected to a take-up reel, with an idler pulley being raised above the reel. Cable is pulled by making several nonoverlapping wraps of a polyethylene pulling rope around the capstan, extending the rope over the idler pulley, wrapping the rope around the reel, and engaging the function selector and speed control valves for causing rotation of the capstan and take-up reel.

29 Claims, 4 Drawing Figures

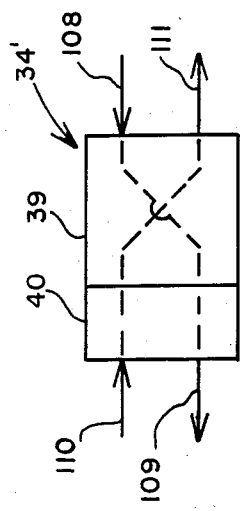
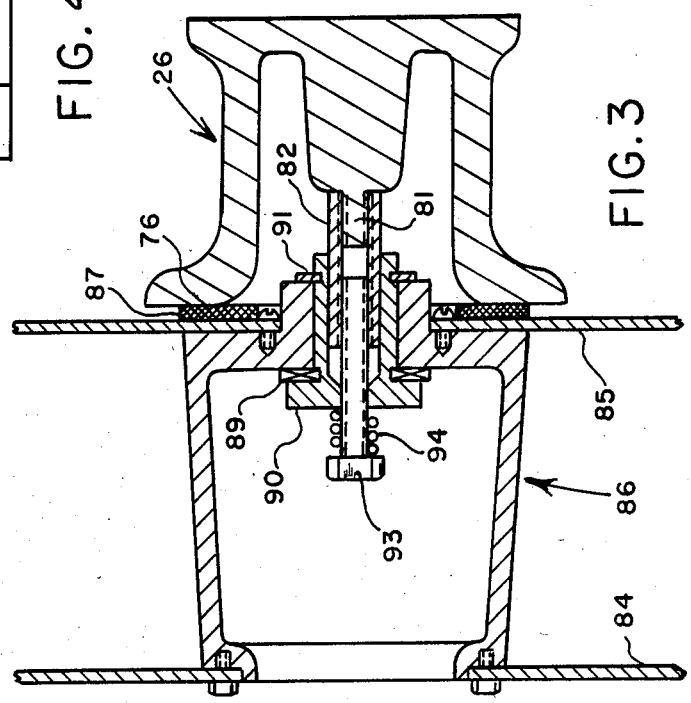
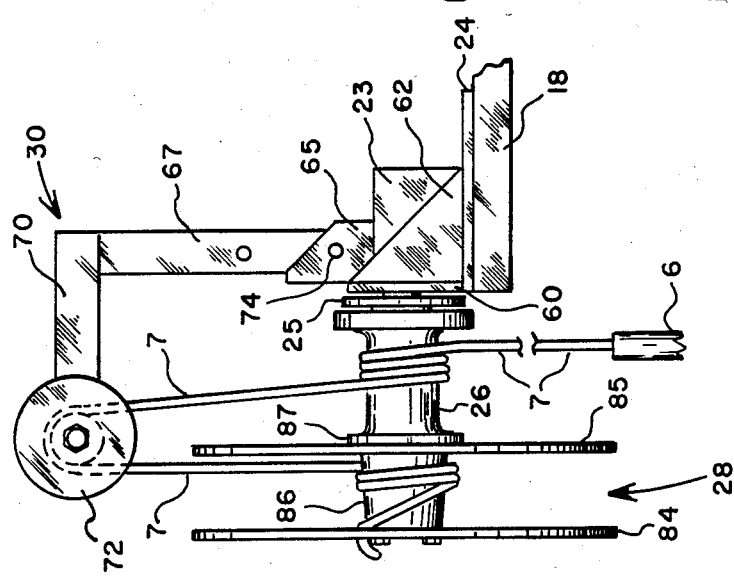

MOTOR VEHICLE MOUNTED APPARATUS FOR PULLING OPTICAL FIBER CABLE

BACKGROUND OF THE INVENTION

This invention relates to the placement of optical fiber cable (OFC), coaxial cable and twisted pair telephone cable in conduit, and more particularly to improved motor vehicle mounted apparatus for and method of placing optical fiber cable in subduct that was previously placed in an underground duct-type conduit.

Techniques are constantly being devised for pulling longer continuous lengths of optical fiber cable. In the more advanced techniques, flexible one inch diameter polyethylene pipe or subduct is pulled into four inch diameter underground duct pipes. The subduct is connected so that it runs continuously between an input manhole and an output manhole. After blowing a light weight fish line through the subduct, a pulling line is pulled through the subduct and connected with a pulling sock to the free end of an optical fiber cable on a reel that is located adjacent the input manhole. The other end of the pulling line is connected to some sort of pulling apparatus at the output manhole. During pulling of the cable a liquid lubricant such as vasoline, hydralube blue, or silicone is introduced into the input end of the subduct along with the cable. The pulling tension must be maintained less than a maximum value such as 600 pounds to prevent damaging the cable. Although motor vehicle mounted cable pulling apparatus is currently available, much of it is expensive and not convenient to use. Some cable pulling apparatus is so large and bulky that it dictates that a truck be dedicated to this application. Other cable pulling apparatus that is located on the bed of a truck is large and cumbersome and must be physically unloaded from the truck by several people or with a fork lift and then set up next to the output manhole. Such equipment is difficult and expensive to use, and is not convenient to use where the output manhole is in an unimproved area. Trailer mounted pulling apparatus also suffers from the latter disadvantage. And a cable pulling technique which employs the take-up reel on a telephone line truck to pull the cable requires that a very expensive motor vehicle be utilized in this application. Although portable cable pulling apparatus such as that described in the brochure HCPU-1 Light Guide Pulling System, manufactured by Hydraulic Energy Company of San Rafael, Calif. is relatively light such that it can be readily transported on a truck and carried up to a manhole, it requires considerable setup time and is relatively unstable compared to equipment that is mounted on a fixed pallet structure or a truck.

An object of this invention is the provision of improved motor vehicle mounted apparatus for pulling optical fiber cable.

SUMMARY OF INVENTION

In accordance with this invention optical fiber cable pulling apparatus that is mounted on a motor vehicle that may be driven up next to a manhole from which it is desired to pull a cable that is connected to one end of a pulling line which extends out of the manhole comprises a motor having an axis of rotation for a drive member thereof; means for attaching the motor to a solid-rigid part of the vehicle with the motor being within the perimeter of the vehicle and the axis of the motor being generally transverse to the vehicle; drive means for driving the motor; means for connecting the drive means to the motor; and a capstan that is rotatably connected to the drive member of the motor only when the vehicle is located proximate the manhole; the other end of the pulling line being wrapped around the capstan when it is desired to pull cable and the connecting means being selectively operative for causing the drive means to operate the motor for rotating the capstan for wrapping the pulling line around the capstan for pulling the cable on the one end of the line. In a preferred embodiment, the apparatus further comprises means for stopping rotation of the capstan and removing pull force from the cable when the pull force exerted on the pull line by rotation of the capstan exceeds a prescribed value.

DESCRIPTION OF DRAWINGS

This invention will be more fully understood from the following detailed descriptions of preferred embodiments thereof, together with the drawings in which:

FIG. 2 is a front view of the pulling apparatus taken along line 2—2 in FIG. 1.

FIG. 3 is an enlarged section view of the capstan and take-up reel assembly for illustrating how they are connected together.

FIG. 4 is a schematic view of a modified form of a line speed control unit 34' that is operable for reversing the direction of rotation of the capstan.

DESCRIPTION OF PREFERRED EMBODIMENTS

Figure 1:
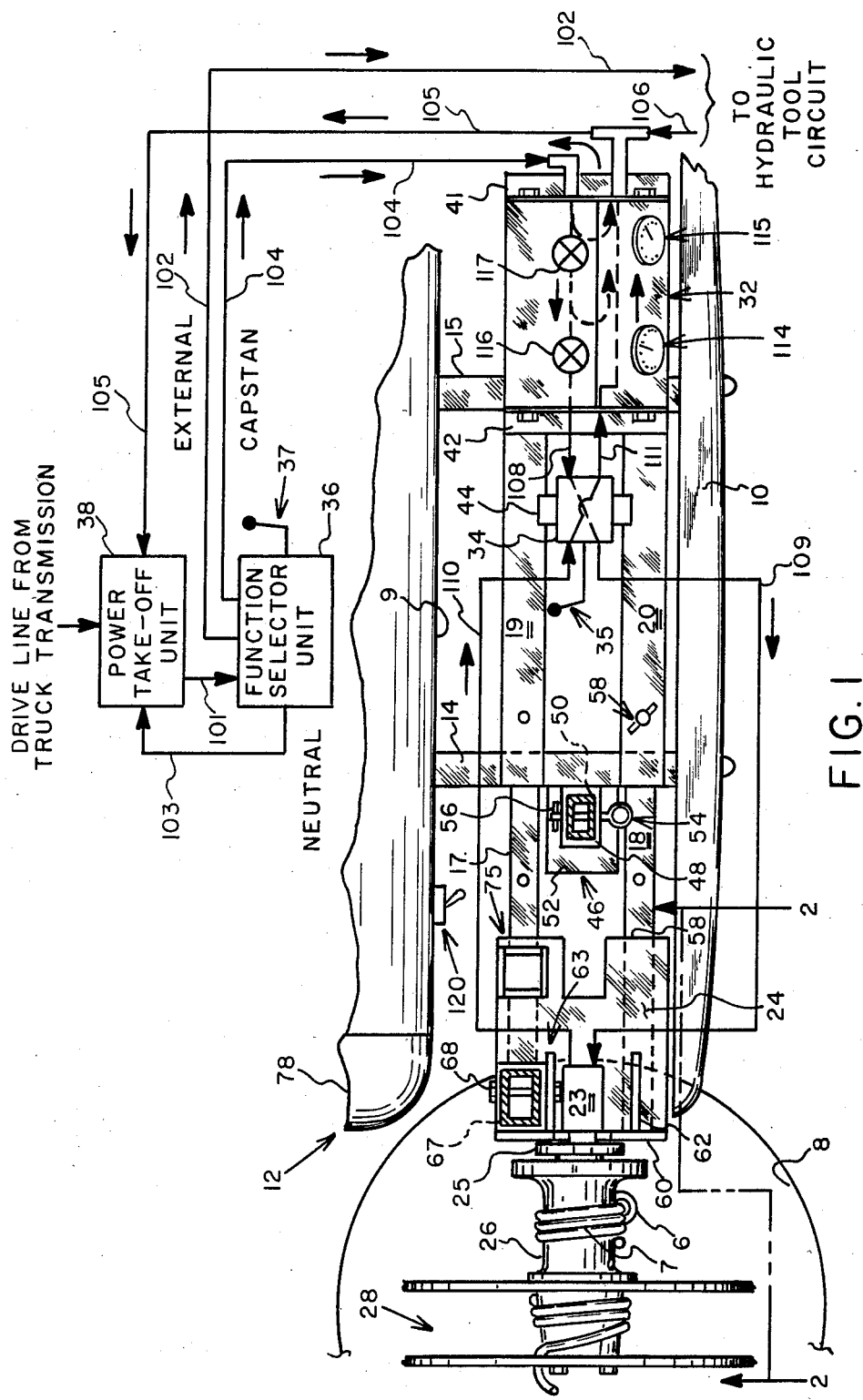
FIG. 1 is a top plan view of optical fiber cable pulling apparatus embodying this invention on the front of a pickup truck 12 with the support plate 24 extended to locate the capstan 26 and take-up reel assembly 28 over a manhole 8.

Truck mounted hydraulic cable pulling apparatus in FIG. 1 that is located between the grill 9 and bumper 10 of a ¾ ton pickup truck 12, for example, only a part of which is shown here, is rigidly attached to elongated bumper support brackets 14 and 15 which are extensions of the frame of the truck. More particularly, the brackets 14–15 may be heavy duty rectangular channels that are bolted and/or welded to associated frame members (not shown) on either side of the truck.

The bumper support mounted cable pulling apparatus comprises pairs of inner and outer telescoping rectangular channel members 17–18 and 19–20, respectively (which are shown in the extended position in FIG. 1); a hydraulic motor 23 on a baseplate 24 that is welded to the free ends of the inner channels 17–18; a capstan 26 on the motor 23; a take-up reel assembly 28; an idler pulley assembly 30 (which is shown in its raised position in FIG. 2); a tension control unit 32; a speed control unit 34; a function selector switch 36; and a hydraulic pump 38 which is a conventional power take-off unit that is selectively connected by an operator to the truck transmission (not shown) and powered by a engine (not shown) of the truck. Alternatively, a separate drive motor and hydraulic pump may be located in the bed of the pickup truck for providing pressurized hydraulic fluid to the cable pulling apparatus as is described more fully hereinafter.

The channel members 19–20 are spaced approximately 14 inches apart. One ends of these outer channels 19–20 are welded to the bumper support bracket 14.

These channel members 19-20 are also welded to the angle iron support brackets 41-42 which are bolted to the tension control unit 32 for holding the latter in place. The channels 19-20 are also welded to the other bumper support bracket 15. In practice, the speed control unit 34 is physically attached to unit 32, although they are shown in FIG. 1 as separate units for convenience of illustration. Additionally, the function selector unit 36 is preferably attached to a plate 44 that extends between and is welded to the channel members 19-20, although they are also shown separated in FIG. 1 for convenience of illustration.

A support assembly 46 is attached to the bumper support bracket 14 for preventing the front end of the truck being pulled down toward the ground by the 500 pounds or so additional weight that is translated to the truck when the apparatus is operating for pulling a cable. The support assembly 46 comprises a short length 48 of rectangular channel that is welded to the bumper support bracket 14 and a length 50 of rectangular channel that slides in the outer channel 48 and which is longer than the distance between the ground and the bumper 10. A foot plate 52 is connected to the bottom of the channel member 50 in the conventional manner so that it loosely rotates and will lie flat on the ground when it is lowered. A heavy duty hitch pin 54 that is retained in place with a horseshoe pin 56 extends through mating holes (not shown) in the channels 48 and 50 for securely holding the channel 50 in a raised or lowered position.

The support plate 24 is made from a ⅜ inch plate of stainless steel, for example, and has an opening 58 in the rear thereof for clearing the channel 48 of the support assembly 46 when the inner channels 17 and 18 are slid into the outer channels 19-20 for storage while the truck is used for purposes other than pulling cable. The inner and outer channels 17-20 are held in an extended or collapsed position by a heavy duty hitch pin 58 and associated horseshoe pin. The plate 24 is welded to a slotted front plate 60 to which the motor 23 is bolted. The front plate 60 is reinforced with right angle flanges or braces 62 and 63 which are welded to the plates 24 and 60.

The idler pulley assembly 30 comprises a short length 65 of outer channel that is welded to the baseplate 24 and which has a longer length 67 of inner channel rotatable mounted therein by a bolt 68. An arm 70 on the top of the member 67 rotatably supports an idler pulley 72 on the end thereof so that the pulley straddles the capstan 26 and the take-up reel 28. Since there is very little force exerted on idler pulley 72 and since any force thereon tends to pull member 67 against the closed side of the sleeve 65, it is not necessary to rigidly fix the position of the channels 65 and 67. Alternatively, a hitch pin (not shown) may be inserted in openings 74 in the channels 65 and 67 for fixing the positions thereof when pulling a cable. Also, the arm 67 may be replaced with telescoping arms such as channels 18 and 20 so that the pulley 72 may be raised higher above the take-up reel. A U-shaped channel member 75 is welded to the plate 24 for holding the idler pulley assembly when it is folded so that the truck may be driven. A hitch pin may be inserted into openings in channels 67 and 75 for preventing movement of the former as the truck passes over bumps.

The take-up reel 28 is connected to the capstan 26 only when the channels 17-18 that support the motor-plate assembly 23-24 are extended for locating the outer edge 76 of the capstan beyond the perimeter of the truck, i.e., beyond the edge of the front right fender 78. Referring now to the section view of the take-up reel and capstan in FIG. 3, the capstan is a cast aluminum member, for example, which is connected to the fly wheel of the motor 23 by bolts (not shown). A threaded shaft portion 81 on the axis of the capstan has an elongated nut 82 rigidly attached thereto which has a smooth-hardened circumference over at least a portion thereof that is spaced away from the capstan and which operates as a bearing race.

The take-up reel assembly 28 comprises a pair of plates or disks 84 and 85 that are attached to opposite faces of a tapered hub 86 by screws. A clutch plate 87 is bonded to the outside of the disk 85 so that it will mate with the edge surface 76 of the capstan when it is connected to the hub 86. Ring and sleeve bearings 89 and 90, respectively, are retained in an opening of the hub 86 by a retaining ring 91. The hub 86 is attached to the capstan by sliding the sleeve bearing 90 over the bearing surface of the nut 82 on the capstan and screwing a bolt 93 into the threaded interior surface of the nut 82. Bolt 93 is firmly hand tightened, for example, against a spring 94 so as to establish a particular rotational force such as 25 pounds that must be exerted on the hub 86 before it will slip at the interface of the friction plate 87 and the face 76 of the capstan.

Again referring to FIG. 1, the power take-off unit 38 provides pressurized hydraulic fluid on line 101 to the function selector unit 36. When the selector lever 37 on the function selector unit 36 is in the external, neutral, and capstan positions the unit 36 provides pressurized hydraulic fluid on line 102 to a hydraulic tool circuit, on line 103 (a return line) to the power take-off unit 38, and on line 104 to the tension control unit 32, respectively. The power take-off unit 38 has a second return line 105 on which it receives fluid from the hydraulic tool circuit and the tension control unit 32. The hydraulic tool circuit is used to drive external hydraulic equipment (not shown) such as a pump that may be located in the manhole 8 to pump water out of it.

The tension control unit 32 comprises a pair of meters 114 and 115, a manual flow bypass knob 116 and associated valve, and a tension adjustment knob 117 and an associated automatic flow bypass valve. The meter 114 provides a continuous display of the pull force that is exerted on the cable. The meter 115 displays a peak maximum pull force that must be exerted on the cable before an automatic bypass valve in the unit 32 automatically bypasses all hydraulic fluid on line 104 back to the power take-off unit on line 105 for automatically disconnecting the flow of hydraulic fluid to the motor 23 and terminating a cable pull. The peak value of pull force that may be exerted on an optical fiber cable is selected by rotating the knob 117. The maximum pull force is preferably selected to be 500 pounds for optical fiber cables having a maximum pull rating of 600 pounds. Since the automatic bypass valve bypasses higher amounts of hydraulic fluid as the maximum allowable pull force is decreased, the fluid flow rate to the pump and rate of pull also decrease as the fluid pressure in the line 104 increases. Thus, the rate of pull gradually decreases to zero as the pull force on the cable approaches the prescribed maximum value. The knob 116 may be manually depressed at any time for causing all hydraulic fluid on line 104 to be redirected to the return line 105 and terminating a cable pull. Hydraulic motor 23, capstan 26, and tension control unit 32 are commercial products of the Hydraulic Energy Company of San Rafael, Calif.

When the truck 12 is to be driven, the take-up reel assembly 28 is removed from the capstan and the inner channels 17-18 are slid into the outer channels 19-20 until the end of the capstan is at least inside the perimeter of the truck. The positions of the channels and capstan are then maintained with the hitch pin 58. The support assembly 46 is also raised and held in an elevated position by the hitch pin 54.

When it is desired to use the truck for pulling optical fiber cable, the truck is driven up near the output manhole 8. After removing the hitch pin 58, the motor 23 and associated channels 17-18 are slid out until at least the end 76 of the capstan clears the side of the truck so that the disk 85 on the take-up reel will not hit it. The hitch pin 58 is reinserted in the channels 17-20 as is illustrated in FIG. 1 to maintain the positions thereof. The take-up reel assembly 28 is then attached to the capstan with the bolt 93 which is tightened against the spring 94 to a desired torque for establishing the level of force at which there will be slippage of the take-up reel and capstan at the clutch plate 87.

The power take-off unit 38 is preferably engaged with the truck engine running during appropriate set-up operations in and around the manhole 8 so that hydraulic fluid in the system will be heated to a stable operating temperature prior to any pulling of the cable. This idle operation time of the hydraulic system may be in the order of 15 minutes. This warm-up may be accomplished by moving the lever 37 on the function selector unit 36 to the capstan position with the knob 116 down for bypassing all hydraulic fluid away from the pump. This eliminates a deadhead position against the valve of the unit 34 which can cause excessive heating of the units 32 and 34. Any water in the manhole 8 may be pumped out during this warm-up period with a hydraulically actuated water pump that is connected to the hydraulic tool circuit lines 102 and 106. The water pump is activated when the truck engine is running by engaging the power take-off unit 38 with the truck transmission, actuating the high speed throttle switch 120 which causes the truck engine to run at a prescribed RPM, and moving the function selection lever 37 to the external position for driving the hydraulic tool circuit. A hydraulic speed control valve may be located in the hydraulic tool circuit if this feature is desired.

As is common in most optical fiber cable pulling techniques, a polyethylene subduct 6 is rodded or pulled between an input manhole and the output manhole 8. The subduct is made to extend continuously between the input and output manholes. A pulling line 7 such as a ⅜ inch diameter polypropylene rope or a jacketed aramid fiber pulling tape is located in the subduct with one end of the line connected through a pulling sock to one end of a cable on a reel thereof that is located adjacent the input manhole. The other end of the line 7 extends out of the subduct 6 in the output manhole 8.

When it is desired to commence pulling of cable, the truck is driven up adjacent to the manhole 8 so that the capstan and take-up reel are preferably both located over the manhole as is shown in FIG. 1. Several turns of the line 7 are then wrapped over the capstan 26, without overlap, before extending the line 7 over the idler pulley 72 and wrapping it around the hub 86 of the take-up reel. The end of line 7 may extend out of a hole in the disk 84 for holding the line 7 on the reel.

Pulling of the cable is iniated by pushing knob 116 down to divert all hydraulic fluid in line 104 back through the unit 32 and onto line 105, placing the function selector lever 37 in the neutral position, energizing the power take-off unit, and actuating the high speed throttle switch 120 prior to placing the function selector lever in the capstan position. Adjustment of the knob 117 is then made to establish the desired 500 pound maximum pulling force on gage 115 at which the automatic bypass valve of the unit 32 will operate for bypassing at least substantially all hydraulic fluid on line 104 to the return line 105 and away from the hydraulic motor 23. The knob 116 can then be pulled up to direct fluid to the speed control unit 34.

After this calibration operation, the speed control lever 35 is moved forward for slowly opening the associated valve of unit 34 to pass hydraulic fluid on lines 109 and 110 to and from the pump 23 for turning the capstan which wraps rope 7 around it, over the reel 72, and onto the take-up reel 28 which is turned by the capstan. As the thickness of rope 7 builds up on the reel 28 it tends to pull more rope than comes off of the capstan, so the reel will slip along the surface of the clutch plate 87. If too much rope builds up on the spool 28, the cable pull can be stopped momentarily while disk 84 is removed from the hub 86, the rope 7 on the hub is reefed and removed from the hub, and the disk 84 is again attached to the hub. The rate of rotation of the capstan and thus of the pulling of the rope and cable is controlled by how far the flow valve of unit 34 is opened and the pull force or drag created by the cable. Meters may be connected directly to the line 7 at the output manhole for displaying a rate and length of a cable pull. Alternatively, a meter may be located in line 109 or 110 for indicating the rate of a cable pull. The meter 114 displays the pulling force on the line 7, and thus the cable, at any instant in time.

As the pull force on the cable approaches its maximum allowable value, the automatic bypass valve gradually passes more and more hydraulic fluid so that the rate of pull gradually decreases. When the pull force exerted on the optical fiber cable by the line 7, which pull force is proportional to the hydraulic pressure in the lines 109-111 and thus the unit 32, reaches the maximum level established by the automatic bypass valve associated with knob 117, then this valve passes all of the hydraulic fluid on line 104 away from the pump 23 and back to the return line 105 through the unit 32 for stopping the pulling of cable.

Although this invention is described in relation to preferred embodiments thereof, variations and modifications thereof are possible. By way of example, the motor vehicle may be of any type such as an automobile, a van, a pickup truck, a flat bed truck, a jeep, a carryall vehicle, etc., and the cable pulling apparatus may be located on the front or rear bumper support members, the bed of the truck, inside the van, across the fenders or top of the bed of a pickup truck, etc. In certain of these vehicles the cable pulling apparatus may be slid out past the front or rear of the vehicle rather than the side thereof as is illustrated in 1. Also, the cable pulling apparatus may be extended by hydraulic or electrical means. Further, the cable pulling apparatus may be completely powered by electrical means by replacing the hydraulic motor 23 with a DC electric motor that is driven by the electrical system of the motor vehicle; and replacing the control console 32 with a meter that senses electrical current that is applied to the motor (which current is directly related to the torque on the motor and the pull force on the cable) and a relay for interrupting current flow to the DC motor when it exceeds a prescribed threshold value. In this embodiment the manual flow bypass valve 116 is replaced by an electrical switch. Additionally, the hydraulic cable pulling apparatus illustrated in the figures may be driven by a hydraulic pump on the vehicle which is powered by other than the engine thereof. Further, the capstan 26 may be kept completely within the perimeter of the truck during pulling of cable by placing an extension on the hub 86 of the take-up reel which is sufficient to cause the disk 85 thereof to clear the fender of the truck when it is attached to the capstan. Also, the capstan does not have to be attached to or remain on the motor 23 when the truck is being driven around. Rather, it is only necessary to attach the capstan to the motor 23 when it is desired to use the apparatus to pull optical fiber cable. Further, the capstan may be replaced with a conventional collapsible take-up reel of the type used on telephone line trucks so that the polyethylene rope can build up on it to a prescribed thickness, after which cable pulling is interrupted while the pulling rope is reefed and removed from the reel prior to again taking a couple of wraps of the rope around the reel and continuing the cable pull. Also, a conventional double pulley assembly that is attached to a right angle brace member may be located over the edge of the manhole for changing the direction or angle at which the pulling rope exits the manhole so that the truck and capstan may be spaced away from the manhole rather than having to drive the truck so as to place the capstan directly over the manhole. Additionally, the diameter of the capstan may be made sufficient (e.g., 24 inches) to allow optical fiber cable to be wound directly onto it and then off onto the ground in order to get an extra length thereof at the output manhole. Further, a speed control unit 34' such as is illustrated in FIG. 4 may be employed for reversing the direction of rotation of the motor 23. In the unit 34' the end part 40 is rotated 180° in a plane orthogonal to the plane of the paper in order to reverse the direction of flow in the lines 109 and 110 and thus the motor. An O-ring provides the desired seal between the two parts 39 and 40 in FIG. 4. Also, the apparatus disclosed here may be used for pulling cable in applications other than underground ducts. Further, clutch means may be used to connect the fly wheel 25 on the motor to the capstan. The scope of this invention is therefore to be determined by the appended claims rather than from the prior detailed descriptions of preferred embodiments thereof.

What is claimed is:

1. Optical fiber cable pulling apparatus mounted on bumper support brackets of a motor vehicle that may be driven up next to a manhole from which it is desired to pull the cable that is connected to one end of a pulling line that extends out of the manhole, said apparatus comprising:
   motor means having an axis of rotation of a drive member thereof;
   capstan means having an axis of rotation;
   first connecting means for rotatably connecting said capstan means to said drive member of said motor means with said capstan means located inboard of the perimeter of the motor vehicle;
   first means for attaching said motor means to the bumper support brackets with the extremity of said capstan being within the perimeter of the motor vehicle and the axes of the capstan means and motor means being generally transverse to the motor vehicle;
   means for driving said motor means;
   second connecting means for connecting said drive means to said motor means;
   said motor vehicle being located proximate the manhole and having the other end of the pulling line wrapped around said capstan means when it is desired to pull cable; and
   first means for causing one of said first and second connecting means to selectively cause operation of said drive means to operate said motor means for rotating said capstan means for wrapping the pulling line around the capstan means for pulling the cable on the one end of the pulling line.

2. Apparatus according to claim 1 wherein said first attaching means comprises pairs of inner and outer telescoping channel members, said pair of outer channel members being rigidly attached to spaced apart bumper support brackets so that said inner channel members can slide into and out of said outer channel members; said motor means being rigidly mounted on said inner channel members at points that are spaced away from the ends thereof that slide into said outer channel members; said inner channel members sliding into said outer channel members for locating said capstan means inboard of the perimeter of the motor vehicle when it is used for other than pulling of cable.

3. Apparatus according to claim 2 wherein said inner channel members are moved in said outer channel members for locating said capstan means outboard of the perimeter of the motor vehicle during pulling of cable.

4. Apparatus according to claim 3 further comprising means for stopping rotation of said capstan means and removing pull force from the cable when the pull force exerted on the pull line by rotation of said capstan means exceeds a prescribed value.

5. Apparatus according to claim 4 wherein said stopping means comprises means for selectively disabling said drive means.

6. Apparatus according to claim 4 wherein said stopping means comprises means for selectively disconnecting said drive means from said motor means.

7. Apparatus according to claim 4 wherein said stopping means comprises means for selectively disconnecting said capstan means from said motor means.

8. Apparatus according to claim 4 further comprising:
   a take-up reel;
   second means for attaching said take-up reel to said capstan means when the latter is located for pulling cable, said take-up reel being located outside the perimeter of the motor vehicle when it is connected to said capstan means; and
   second means for causing rotation of said capstan means to cause rotation of said take-up reel for transferring the elongated member from said capstan means to said take-up reel.

9. Apparatus according to claim 8 further comprising:
   a first sleeve member;
   a elongated support member having a foot plate on one end thereof and freely sliding in said first sleeve member;
   third means for rigidly attaching said first sleeve member to one of the motor vehicle support brackets for enabling movement of said first support member in a generally vertical direction with respect to the ground;

means for fixedly holding said foot plate in a lowered position with the foot plate in contact with the ground and in a raised position when the vehicle is used for pulling and for other then pulling cable, respectively.

10. Apparatus according to claim 9 wherein said second causing means for transferring the pulling line from said capstan means to said take-up reel comprises:
an idler pulley;
a second sleeve member;
fourth means for rigidly attaching said second sleeve member to one of said inner channel members proximate said motor means;
a second support member rotatably mounted in said second sleeve member so as to be in a relatively horizontal-storage position when not in use for pulling cable and to be rotated to a raised vertical position during pulling of cable; said second support member in a raised position having an arm thereon which extends therefrom and supports said idler pulley over at least a portion of said take-up reel, the pulling line extending from said capstan means up and over said idler pulley and onto said take-up reel during pulling of cable, whereby rotation of said capstan means causes rotation of said take-up reel.

11. Apparatus according to claim 1 wherein said motor means comprises an electric motor.

12. Apparatus according to claim 1 wherein said motor means comprises a hydraulic motor.

13. Optical fiber cable pulling apparatus mounted on a motor vehicle that may be driven proximate a manhole from which it is desired to pull the cable that is connected to one end of elongated pulling line that extends out of the manhole, said apparatus comprising:
a pair of inner and outer telescoping channel members, said pair of outer channel members being firmly attached to a solid-rigid part of the motor vehicle so that said inner channels can slide in associated ones of said outer channel members;
motor means;
first means for rigidly attaching said motor means on said inner channel members at points that are spaced away from said outer channel members in the direction of the perimeter of the motor vehicle;
capstan means having an axis of rotation;
first connecting means for rotatably connecting said capstan means to said motor means with the axis of the capstan means extending generally in the direction of a perimeter of the vehicle;
said telescoping channel members being adjusted for locating said capstan means at least partially outboard of and totally inboard of the perimeter of the motor vehicle during pulling of cable and during use of the motor vehicle for other than pulling of cable, respectively;
drive means for driving said motor means;
second connecting means for connecting said drive means to said motor means;
said motor vehicle being located proximate the manhole and having the other end of the pulling line wrapped around said capstan means when it is desired to pull cable;
first means for causing one of said first and second connecting means to selectively cause operation of said drive means to operate said motor means for rotating said capstan means for wrapping said pulling line around the capstan means for pulling cable on the one end of the pulling line; and
means for stopping rotation of said capstan means and removing pull force from the cable when the pull force exerted on the pull line by rotation of said capstan means exceeds a prescribed value.

14. Apparatus according to claim 13 wherein said stopping means comprises means for selectively disabling said drive means.

15. Apparatus according to claim 13 wherein said stopping means comprises means for selectively disconnecting said drive means from said motor means.

16. Apparatus according to claim 13 wherein said stopping means comprises means for selectively disconnecting said capstan means from said motor means.

17. Apparatus according to claim 13 further comprising:
a take-up reel;
second means for attaching said take-up reel to said capstan means when the latter is located for pulling cable, said take-up reel being located outside the perimeter of the motor vehicle when it is connected to said capstan means; and
second means for causing rotation of said capstan means to cause rotation of said take-up reel for transferring the elongated member from said capstan means to said take-up reel.

18. Apparatus according to claim 17 further comprising:
a first sleeve member;
first elongated support member having a foot plate on one end thereof and freely sliding in said first sleeve member;
third means for rigidly attaching said first sleeve member to one of the motor vehicle support brackets for enabling movement of said first support member in a generally vertical direction with respect to the ground;
means for fixedly holding said first support member and foot plate in a lowered position with the foot plate in contact with the ground and in a raised position when the vehicle is used for pulling and for other then pulling cable, respectively.

19. Apparatus according to claim 18 wherein said second causing means for transferring the pull line from said capstan means to said take-up reel comprises:
an idler pulley;
a second sleeve member;
fourth means for rigidly attaching said second sleeve member to one of said inner channel members proximate said motor means;
a second support member rotatably mounted in said second sleeve member so as to be in a relatively horizontal-storage position when not in use for pulling cable and to be rotated to a raised-vertical position during pulling of cable; said second support member in a raised position having an arm thereon which extends therefrom and supports said idler pulley over at least a portion of said take-up reel, the pulling line extending from said capstan means up and over said idler pulley and onto said take-up reel during pulling of cable, where rotation of said capstan means causes rotation of said take-up reel.

20. Optical fiber cable pulling apparatus mounted on a motor vehicle that may be driven proximate a manhole from which it is desired to pull the cable that is connected to one end of a pulling line that extends out of the manhole, said apparatus comprising:

a pair of inner and outer telescoping channel members, said pair of outer channel members being firmly attached to a solid-rigid part of the motor vehicle so that said inner channels can slide in associated ones of said outer channel members;

hydraulic motor means;

first means for rigidly attaching said motor means on said inner channel members at points that are spaced away from said outer channel members in the direction of a perimeter of the motor vehicle;

capstan means having an axis of rotation;

first connecting means for rotatably connecting said capstan means to said motor means with the axis of the capstan means extending generally in the direction of a perimeter of the vehicle;

said telescoping channel members being adjusted for locating said capstan means at least partially outboard of and totally inboard of the perimeter of the motor vehicle during pulling of cable and during use of the motor vehicle for other than pulling of cable, respectively;

hydraulic drive means for driving said motor means;

second connecting means for connecting said drive means to said motor means;

said motor vehicle being located proximate the manhole and having the other end of the pulling line wrapped around said capstan means when it is desired to pull cable;

first means for causing one of said first and second connecting means to selectively cause operation of said drive means to operate said motor for rotating said capstan for wrapping said pulling member around the capstan for pulling cable on the one end of the pulling line; and means for stepping rotation of said capstan means and removing pull force from the cable when the pull force exerted on the pull line by rotation of said capstan means exceeds a prescribed value.

21. Apparatus according to claim 20 wherein said second connecting means comprises tension control console means comprising:

means for establishing a hydraulic threshold pressure that is related to a prescribed maximum pull force that is not to be exceeded on the cable;

means for sensing the hydraulic pressure that is applied to said motor means and thus the pulling force on the pulling line that is translated to the cable; and means for bypassing hydraulic fluid away from said motor means for stopping rotation of said capstan means when the pressure of hydraulic fluid applied to said motor means is greater than said threshold value.

22. Apparatus according to claim 21 wherein said first causing means comprises a function selector means in series in the hydraulic path between said drive means and said tension control means, said function selector means having a neutral position for diverting fluid away from said tension control means and back to said drive means and having a capstan position for directing hydraulic fluid to said tension control means.

23. Apparatus according to claim 22 comprising an external hydraulic tool circuit, said function selector means having an external tool circuit position for directing hydraulic fluid only to said external tool circuit.

24. Apparatus according to claim 22 wherein said second connecting means further comprises a speed control valve means in series between said tension control means and said motor means for controlling the amount of hydraulic fluid that is passed to said motor means.

25. Apparatus according to claim 24 wherein said tension control means has a manually controlled valve means which may be manually operated for bypassing hydraulic fluid away from said speed control means when it is desired to stop rotation of said capstan means or to fully close the speed control valve for an extended time interval.

26. Apparatus according to claim 25 further comprising:

a take-up reel;

second means for attaching said take-up reel to said capstan means when the latter is located for pulling cable, said take-up reel being located outside the perimeter of the motor vehicle when it is connected to said capstan means; and second means for causing rotation of said capstan means to cause rotation of said take-up reel for transferring the pull line from said capstan means to said take-up reel.

27. Apparatus according to claim 26 further comprising:

a first sleeve member;

a first elongated support member having a foot plate on one end thereof and freely sliding in said first sleeve member;

third means for rigidly attaching said first sleeve member to the solid part of the motor vehicle for enabling movement of said first support member in a generally vertical direction with respect to the ground; and means for fixedly holding said first support member and foot plate in a lowered position with the foot plate in contact with the ground and in a raised position when the vehicle is used for pulling and for other then pulling cable, respectively.

28. Apparatus according to claim 27 wherein said second causing means for transferring the pull line from said capstan means to said take-up reel comprises:

an idler pulley;

a second sleeve member;

fourth means for rigidly attaching said second sleeve member to one of said inner channel members proximate said motor means;

a second support member rotatably mounted in said second sleeve member so as to be in a relatively horizontal-storage position when not in use for pulling cable and to be rotated to a raised-vertical position during pulling of cable; said second support member in a raised position having an arm thereon which extends therefrom and supports said idler pulley over at least a portion of said take-up reel, the pulling line extending from said capstan means up and over said idler pulley and onto said take-up reel during pulling of cable, where rotation of said capstan means causes rotation of said take-up reel.

29. Optical fiber cable pulling apparatus mounted on a motor vehicle that may be driven up next to a manhole from which it is desired to pull the cable that is connected to one end of pulling line that extends out of the manhole, said apparatus comprising:

motor means having an axis of rotation for a drive motor thereof;

means for attaching said motor means to a solid-rigid part of the motor vehicle with said motor means being within the perimeter of the motor vehicle; said attaching means comprising pairs of inner and outer telescoping channel members, said pair of outer channel members being rigidly attached to the solid-rigid parts of the motor vehicle so that said inner channel members can slide into and out of said outer channel members; said motor means being rigidly mounted on said inner channel members at points that are spaced away from the ends thereof that slide into said outer channel members; said inner channel members sliding into said outer channel members for locating said motor means inboard of a perimeter of the motor vehicle when it is used for other than pulling of cable; said inner channel members being moved in said outer channel members for locating said capstan means outboard of the perimeter of the motor vehicle during pulling of cable;

drive means for driving said motor means;

means for connecting said drive means to said motor means;

a capstan means rotatably connected to said drive member of said motor means only when said motor vehicle is located proximate the manhole, the other end of the pulling line being wrapped around said capstan means when it is desired to pull cable; said connecting means being selectively operative for causing said drive means to operate said motor means for rotating said capstan means for wrapping the pulling line around the capstan for pulling the cable on the one end of the line; and means for stopping rotation of said capstan means and removing pulling force from the cable when the pull force exerted on the pull line by rotation of said capstan means exceeds a prescribed value.

* * * * *